Feb. 7, 1961
C. L. JOHNSON
2,971,103
PULSE FORMING NETWORK AND SWITCHING MEANS THEREFOR
Filed May 25, 1959
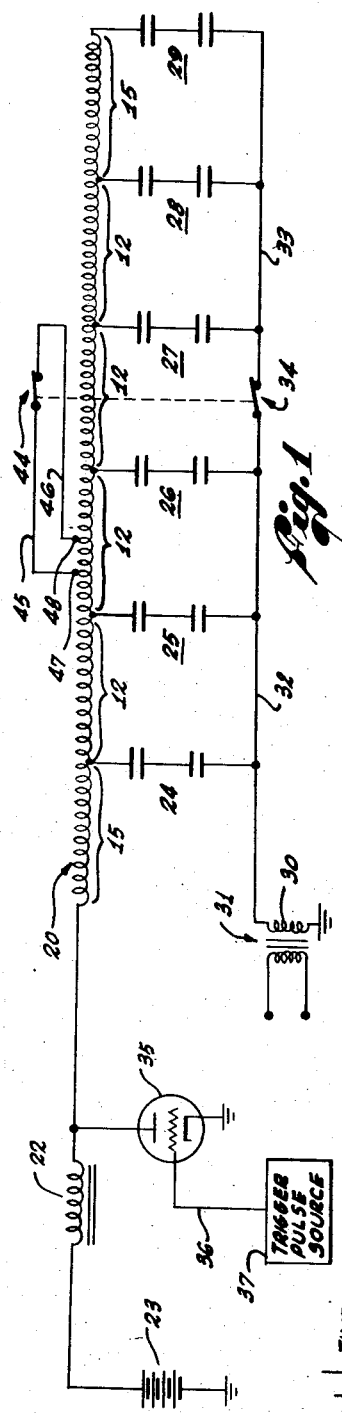
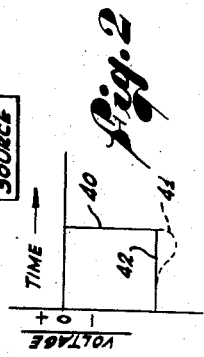
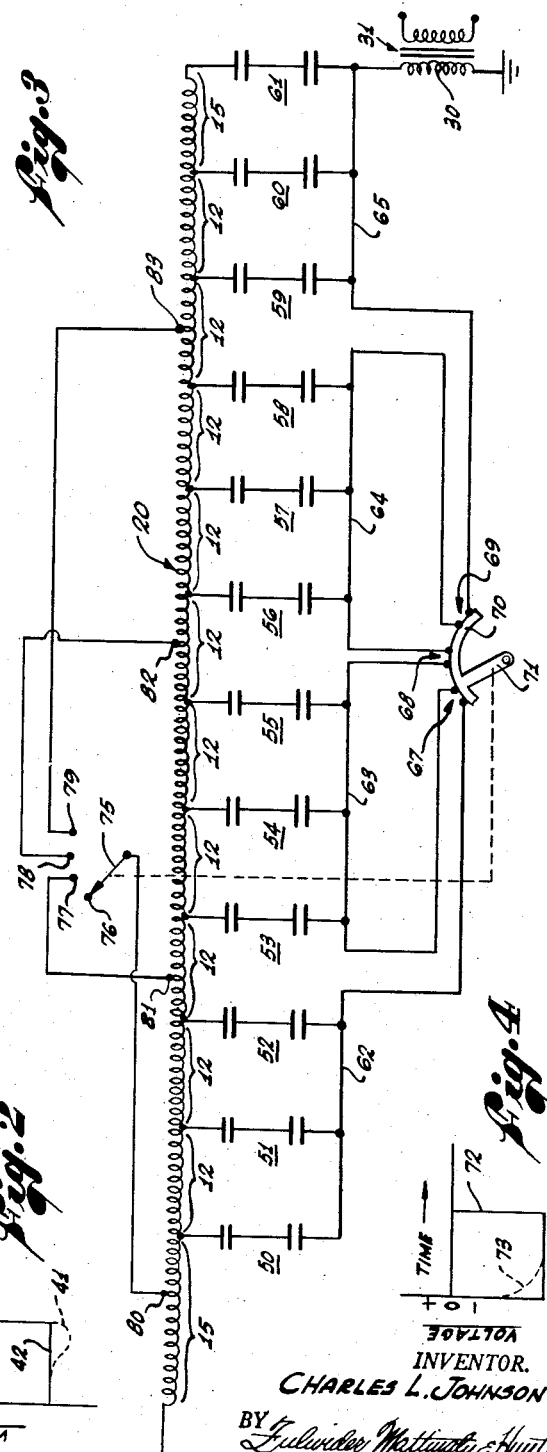
INVENTOR.
CHARLES L. JOHNSON
BY
Attorneys United States Patent Office 2,971,103
Patented Feb. 7, 1961

2,971,103

PULSE FORMING NETWORK AND SWITCHING MEANS THEREFOR

Charles L. Johnson, 220 S. Doheny Drive, Beverly Hills, Calif.

Filed May 25, 1959, Ser. No. 815,590

9 Claims. (Cl. 307—108)

This invention relates to pulse forming networks, and more particularly to a unique switching arrangement for such networks.

A typical pulse forming network employs a charging coil and a plurality of groups of series-connected capacitors connected between respective taps on the coil and the primary winding of a pulse transformer. The charging end of the coil is connected to a D.-C. voltage source, from which the capacitors are charged through the coil. Periodically, the charging end of the coil is connected to ground potential, whereupon the capacitors are discharged to establish a voltage pulse across such primary winding. The magnitude of the pulse is determined by the level of the charge, which is the same on each group of capacitors, and the pulse duration is governed by the number of capacitor groups employed.

It is often desired to use the same charging coil and different combinations of the groups of capacitors to provide output pulses of different widths, or durations. For example, two sections of a total of six groups of capacitors may be employed to establish a pulse of four microseconds duration, and a pulse of two microseconds duration is established when only one section (half of the groups) is used. Normally, a switch is provided in the common connection between the two sections, being closed when all the groups are operative and opened when it is desired to use only half the groups.

A serious problem in pulse forming networks resides in the allotment of turns of the coil associated with the groups of capacitors at each end, i.e., "compensating" winding turns to insure the formation of a pulse of constant height. Normally, compensating winding turns are designed to insure the proper shape of the pulses for effecting operation of other equipment in a predetermined manner, e.g., a magnetron oscillator which develops oscillations of a frequency corresponding to the shape of triggering pulses. For the desired rectangular pulse waveform the oscillator output is of a fixed frequency; but if the pulse height is nonuniform the oscillations vary in frequency.

Prior art pulse forming networks of the type above mentioned do not provide the proper compensating winding turns for each of the end groups of capacitors in both combinations, i.e., where half or all the capacitor groups are employed. Normally, the compensating turns are properly designed for only one combination, e.g., where all the groups are employed to establish a pulse width of four microseconds. Accordingly, when switching to reduce the number of operative capacitor groups to one half, the desired compensation at one end is lacking; the resulting two-microsecond pulses are characterized by irregular waveforms, and the oscillator develops a varying frequency output.

It is an object of this invention to provide a pulse-forming network which is not subject to the limitations of prior art pulse forming networks.

It is another object of this invention to provide, for a pulse forming network of the type having a plurality of groups of capacitors connected to respective taps on a charging coil, switching means to permit various combinations of capacitors to be selected to develop pulses of desired widths, and to automatically provide compensating winding turns to insure the pulses being established with a predetermined waveform.

A further object of this invention is to provide, for a pulse forming network using a charging coil and capacitors connected thereto at respective taps, switching means utilizing the charging coil to automatically provide compensating winding turns for any group of operative capacitors.

A still further object of this invention is to provide means for automatically selecting proper winding compensation for any portion of an inductance-capacitance network employed for forming pulses.

The above and other objects and advantages of this invention will become apparent from the following description taken in conjunction with the accompanying drawing of illustrative embodiments thereof, and in which:

Figure 1 is a schematic diagram of a pulse forming network showing combined switches for selecting either of two sections of capacitors to be used with a charging coil, and for utilizing a portion of the charging coil when using only one section to provide winding compensation;

Figure 2 is a plot of voltage against time, illustrating the effect on the waveform of a pulse developed by the network of Figure 1;

Figure 3 is a schematic diagram of a pulse forming network having switching means for selecting one of a number of sections of capacitors and automatically providing the necessary compensation; and Figure 4 is a plot of voltage against time, illustrating the effect on the pulse waveform developed by the circuit of Figure 3.

Referring to Figure 1, there is shown a pulse forming network having a charging coil 20 which at one end is connected through a choke 22 to a D.-C. charging source 23. The coil 20 has connected thereto a number of groups of capacitors, here illustrated as six groups of series connected capacitors 24, 25, 26, 27, 28 and 29 connected to spaced taps along the coil 20. The capacitor groups 24–29 are arranged in two sections of three groups for connection to the primary winding 30 of a pulse transformer 31. To this end, the three groups 24–26 are connected between their respective taps and a common connection 32, which is connected to the ungrounded terminal of the primary winding 30, and the three groups 27–29 are connected between their taps and a common connection 33. A switch 34 is provided between the connections 32, 33 for connecting and disconnecting them.

In order to establish a pulse across the primary winding 30, the charging end of the coil 20 is provided with conventional switching means to connect it to ground. Such switching means preferably is electronic, and may comprise a conventional thyratron tube 35 having its plate-cathode path connected between the charging end of the coil 20 and ground, and having its grid connected, as at 36, to a source 37 of trigger pulses having a predetermined repetition rate. When a trigger pulse is applied, the thyratron 35 is rendered conducting, and is adapted to maintain its conducting state for a period longer than the duration of the trigger pulse.

When a trigger pulse is applied to the tube 35, the charging end of the coil 20 is connected through the tube to ground, thereby completing a D.-C. path in which the primary winding 30 is in circuit with the coil 20 and its capacitors. The height of the pulse is determined by the level of the charge, and the duration (or width)

of the pulse is dependent upon the number of groups of capacitors to be discharged. The trigger pulses from the source 37 are sufficiently spaced to permit the capacitors to be charged to the same level between trigger pulses. With the switch 34 closed, both sections of the capacitor groups 24–26, 27–29 are both operative; when the switch 34 is open, only the section 24–26 is operative. If each section has the same capacitance, pulses established when the switch 34 is open will be half the width of pulses established when the switch is closed.

As previously mentioned, it is necessary that the turns of the coil 20 be allotted so that the pulse established across the primary winding 30 is of the desired shape. This normally means that the turns associated with the end groups of capacitors are greater in number than those associated with the intermediate groups of capacitors; the intermediate capacitor groups normally having the same number of turns associated therewith. For example, the intermediate groups of capacitors 25–28 may each have twelve turns of the winding 20 connected between them and the adjacent capacitor groups, while the portions of the winding 20 between the capacitor groups 28 and 29, and between the charging end of the coil 20 and the capacitor group 24, have a greater number of turns, e.g., fifteen turns.

Generally, the proper compensation is designed for pulses of maximum duration, i.e., where both sections or capacitor groups 24–26, 27–29 are operative. If it is desired to develop pulses of the same magnitude but half the duration, i.e., the switch 34 is opened. However, it will be seen that this would result in an arrangement wherein only twelve winding turns are associated with the end capacitor group 26 of the section 24–26. As is usually the case, the number of turns associated with an intermediate capacitor group is improper to provide compensation, and this results in a degraded pulse waveform. How the waveform is affected is indicated in Figure 2.

Referring to Figure 2, the shape of the leading portion of a pulse 40 is controlled in this instance by the compensating windings provided at the charging or input end, i.e., the windings associated with the capacitor groups 24, just as it is where both sections 24–26, 27–29 are utilized. However, the shape of the trailing portion of the pulse 40 is attributable to the winding turns associated with the capacitor group 26. Assuming that twelve winding turns are not sufficient to provide compensation, there is under-compensation, causing the trailing portion to increase in magnitude immediately preceding the termination of the pulse, as indicated at 41.

Assuming that fifteen winding turns would have to be associated with the capacitor group 26 in order to provide the desired compensation, and thereby shape the trailing edge portion properly, as at 42, it will be seen that prior art pulse forming networks operated in this fashion would fail to give the same shape to the output pulse, when using only one section 24–26, as is obtained when using both sections 24–26, 27–29. Accordingly, a device such as a magnetron oscillator (not shown) coupled to the output of the pulse transformer 31, and which has a frequency of operation determined by the magnitude of a pulse, would be made to operate at a plurality of frequencies during the existence of pulses 40 of irregular waveform.

My invention effects the needed compensation by providing the requisite number of winding turns associated with the capacitor group 26 automatically upon opening the switch 34. To do this, I provide a switch 44 which has its contacts connected, as at 45 and 46, to taps 47, 48 intermediate the capacitor groups 25 and 26. The total number of turns (e.g., fifteen) between the capacitor groups 25, 26 is the proper number of turns for compensation when only the one section 24–26 is employed. However the switch 44 is adapted when using both sections 24–26, 27–29, to short, say, three turns between the groups 25, 26, leaving only the twelve turns between the group 25 and the tap 47, and between the tap 48 and the group 26, operative in the charging and discharging of the group 26.

To achieve the desired operation, the switches 34, 44 are ganged so that they open and close together. Thus, when the switch 34 is closed, for using both capacitor sections 23–26, 27–29, the switch 44 is closed to short out three turns between the groups 25, 26, leaving the desired twelve turns comprising the remainder of the turns between the groups 25, 26. When the switch 34 is opened, so that only the section 24–26 is operative, the switch 44 is opened to make all fifteen windings between the groups 25, 26 operative with the group 26. Accordingly, it will be seen that my invention insures that upon switching to one capacitor section 24–26, proper compensation is automatically provided to establish pulses of constant height.

Figure 3 illustrates a pulse forming network wherein my invention permits one or more of several capacitor groups, connected to a single charging coil, to be made selectively operable. Four sections of capacitor groups 50–52, 53–55, 56–58, and 59–61 are provided in which the capacitor groups of each section are connected between respective taps on the coil 20 and common connections 62, 63, 64, and 65. Three pairs of fixed contacts 67, 68, and 69 are provided, the contacts of the pair 67 being connected to the connections 62 and 63, the contacts of the pair 68 being connected to the connections 63 and 64, and the contacts of the pair 69 being connected to the connections 64 and 65. The primary winding 30 of the pulse transformer 31 is connected between the connection 65 and ground.

The circuit of Figure 3 is adapted for utilizing the capacitor sections in the following combinations: (a) all of the sections, (b) sections 53–55, 56–58, and 56–61, (c) sections 56–58 and 59–61; and (d) sections 59–61. To effect such combinations, I utilize an arcuate contact element 70 of sufficient length to span all three pairs of contacts 67, 68, and 69, and which is rotated by an arm 71 affixed to one end thereof. With the contact 70 connecting the pairs of contacts 67–69 as shown, all the sections of capacitors are operative. Upon rotating the arm 71 to the right, i.e., clockwise, to a position wherein the contact element 70 spans only the pairs of contacts 68 and 69, the section 50–52 is removed from operation. Further movement of the arm 71 clockwise to position the contact 70 so that it connects only the contacts of the pair 69 results in removal of the sections of capacitor groups 50–52 and 53–55 from operation. Further movement of the arm 71 clockwise to position the contact 70 so that it does not contact any of the pairs of contacts, leaves only the end section of capacitor groups 59–61 in operation with the coil and the pulse transformer 21.

Since the capacitor section 59–61 is the end section in all of the above-described combinations, the fifteen winding turns associated with the capacitor groups 61 insures that the proper compensation is provided for the trailing edge portion of pulses developed by this circuit. However, it will be seen that the number of winding turns from the charging end of the coil 20 will be proper only when all the groups of capacitors are operative. For any other combinations, the number of winding turns is much greater than desired, i.e., there would be progressively greater over-compensation, i.e., more turns than are necessary, as switching progressed to change to three, then two, then one of the various sections. For this reason, the use of prior art pulse forming networks, which do not provide compensation when switching from two sections to one, would be out of the question for arrangements of more than two sections.

Figure 4 illustrates the above described effects. The trailing portion of the pulse 72 has a shape governed by the winding portion associated with the capacitor group 61. For pulses established by any combination of the capacitor sections less than the total number, the overcompensation results in a rounding off of the leading edge, as indicated at 73.

To effect the necessary compensation, I utilize a switch having its movable contact 75 ganged with the arm 71 of the contact 70. The movable contact 75 has four positions 76, 77, 78 and 79, the first of which is a neutral or "dead" position. The movable contact 75 is connected to a tap 80 adjacent the charging end of the coil 20, and the respective fixed contacts 77, 78, and 79 are connected to respective taps 81, 82, and 83 on the coil 20 between the capacitor sections 52–53, 55–56, and 58–59.

When the movable contact 75 is in its neutral position 76, the contact 70 spans the three sets of contacts 67, 68 and 69. When the movable contact 75 engages the contact 77, the contact 70 spans only the pairs of contacts 68, 69, and the combined number of turns between the charging end of the coil 20 and the tap 80, and between the tap 81 and the capacitor group 53, comprise the total number of winding turns needed for proper compensation at the charging or input end of the operative capacitor groups 53–55, 56–58 and 59–61.

When the movable contact 75 engages the contact 78, the arm 70 is in a position where it engages only the pair of contacts 69. In this position of the contact 70, only the sections 56–58 and 59–61 are operative. For such arrangement, the turns between the charging end of the coil 20 and the tap 80 are added to the turns between the tap 82 and the capacitor group 56 to provide the necessary compensation for the charging or input end of these sections 56–58, 59–61.

Similarly, when the movable contact 75 engages the fixed contact 79, the contact 70 is in a position where it does not engage any of the pairs of contacts 67, 68, and 69, i.e., only the end section 59–61 is operative. For this arrangement, the number of winding turns between the charging end of the coil 20 and the tap 80 are added to the number of turns between the tap 83 and the capacitor group 59 to provide the requisite compensation.

Thus, it will be seen that the circuit of Figure 3 is designed to provide output pulses of four different widths. In each case the magnitude of the pulses will be the same, and due to the compensation effected automatically upon switching from one combination of capacitor groups to another, the requisite constant pulse height, as for effecting constant-frequency operation of a magnetron oscillator coupled to the pulse transformer 31, is maintained.

From the foregoing, it will be apparent that while I have shown and described particular embodiments of my invention, various modifications and changes may be made without departing from the spirit and scope of my invention. Therefore, I do not intend that my invention be limited, except as by the appended claims.

I claim:

1. In a pulse forming network having a charging coil and a plurality of capacitive means connected between respective taps on the coil and a common connection to a pulse transformer, wherein a switch in the common connection is adapted to be closed to connect all the capacitive means between the charging end of the coil and the transformer, and to be opened to connect only a predetermined group of the capacitive means between the charging end of the coil and the transformer, wherein the number of turns of the coil at one end of such group of capacitive means is improper to provide compensation for insuring the development of pulses of desired waveform, the combination of: first and second taps on the coil located between the charging end of the coil and the capacitive means at such one end; and a switch connecting said first and second taps to be operated when only the aforementioned group of capacitive means is connected between the charging end of the coil and the transformer, for connecting the proper number of turns to the capacitive means at the one end for compensation.

2. In a pulse forming network having a charging coil and a plurality of capacitive means connected between respective taps on the coil and a common connection to a pulse transformer, wherein a switch in the common connection is adapted to be closed to connect all the capacitive means between the charging end of the coil and the transformer, and to be opened to connect only a predetermined group of the capacitive means between the charging end of the coil and the transformer, wherein the number of turns of the coil at one end of such group of capacitive means is improper to provide compensation for insuring the development of pulses of desired waveform, the combination of: first and second taps on the coil located adjacent the charging end of the coil and the capacitive means at such one end, the number of turns between the charging end and said first tap, and between said second tap and such end capacitive means, being the number of turns needed for the desired compensation; a switch connecting said taps to be closed when only the aforementioned group of capacitive means is connected between the charging end of the coil and the transformer; and means to effect automatic closing and opening of said switch when the switch in the common connection is opened and closed, respectively.

3. In a pulse transformer, the combination of: a charging coil having a charging input end; a capacitive means connected to said coil a predetermined number of turns from said input end; a capacitive means connected to the remaining end of said coil; a capacitive means connected to said coil a predetermined number of turns from said remaining end; additional capacitive means connected to said coil at spaced points intermediate said first and third mentioned capacitive means; and switch means connected to points on said coil intermediate a pair of said additional capacitive means, being adapted to short a predetermined number of turns between said points when closed, and to permit all of said turns between said points to be operative with a capacitive means when opened.

4. A pulse forming network comprising: a charging coil having a plurality of turns to be connected at one end to a source of voltage; a pulse transformer; a plurality of capacitive means each connected between a respective tap on said coil and a common connection to said pulse transformer; a first switch in said common connection intermediate a pair of said capacitive means, said switch when opened connecting only a predetermined number of said capacitive means to said pulse transformer; and a second switch ganged with said first switch, said second switch being connected between respective taps on said coil, one of which is adjacent the ends of said predetermined number of capacitive means, said second switch being open when said first switch is closed and closed when said first switch is open.

5. In a pulse transformer, the combination of: a charging coil having a charging input end; a capacitive means connected to said coil a predetermined number of turns from said input end; a capacitive means connected to the remaining end of said coil; a capacitive means connected to said coil a predetermined number of turns from said remaining end; additional capacitive means connected to said coil at spaced points intermediate said first and third mentioned capacitive means; switch means connected to points on said coil intermediate said predetermined number of turns from said input end and intermediate a pair of said additional capacitive means whereby closing said switch means causes the turns between said input end and the adjacent point to be added to the turns between one of said pair of capacitive means and the remaining point; and additional switch means between said pair of capacitive means being operable to open upon closing said first mentioned switch means.

6. In a pulse forming network, the combination of, a charging coil having one end to be alternately connected between a charging voltage source and ground, said coil being comprised of a plurality of turns; a transformer having a grounded primary winding; a plurality of conductors, one of which is connected to the ungrounded end of said primary winding; switch means for connecting said one conductor to one or more of the remaining conductors; a capacitive network connected between each conductor and said coil, said networks each including at least two capacitive elements connected to respective taps on said coil, each combination of capacitive networks connected to said primary winding requiring predetermined numbers of turns of said coil between the adjacent capacitive elements connected to said one conductor and between said one end of the coil and the capacitive element nearest thereto for causing pulses developed across said primary winding to have a predetermined waveform; and switching means for adding a portion of the turns between said one end of the coil and the nearest capacitive element of any combination to turns of one of the capacitive elements connected to said one conductor to insure the requisite number of turns as aforementioned for establishing said predetermined pulse waveform.

7. In a pulse forming network, the combination of: a charging coil having one end to be alternately connected between a charging voltage source and ground, said coil being comprised of a plurality of turns; a transformer having a grounded primary winding; a plurality of conductors, one of which is connected to the ungrounded end of said primary winding, the remaining end of said one conductor and each end of the other conductors being connected to a respective fixed contact; contact means for connecting the contact of said one conductor to one or more of the remaining contacts whereby to connect said one conductor to one or more of the other conductors; a capacitive network connected between each conductor and said coil, said networks each including at least two capacitive elements connected to respective taps on said coil, each combination of capacitive networks connected to said primary winding requiring predetermined numbers of turns of said coil between the adjacent capacitive elements connected to said one conductor and between said one end of the coil and the capacitive element nearest thereto for causing pulses developed across said primary winding to have a predetermined waveform; and a switch having a movable contact and a plurality of fixed contacts, said movable contact being connected to said coil at a point a predetermined number of turns from said one end thereof, a fixed contact being connected to a respective point on said coil adjacent one of the capacitive elements of each section, said points being located so that the combination of turns between said one end of the coil and said movable contact, and between each fixed contact and the associated adjacent capacitive element, provide the requisite number of turns for the associated combination of sections to establish said predetermined pulse waveform.

8. A pulse forming network comprising: a charging coil having one end to be alternately connected between a charging voltage source and ground, said coil being comprised of a plurality of turns; a transformer having a grounded primary winding; a plurality of conductors, one of which is connected to the ungrounded end of said primary winding; switch means for connecting said one conductor to one or more of the remaining conductors; a capacitive network connected between each conductor and said coil, said networks each including at least two capacitive elements connected to respective taps on said coil, each combination of capacitive networks connected to said primary winding requiring predetermined numbers of turns of said coil between the adjacent capacitive elements connected to said one conductor and between said one end of the coil and the capacitive element nearest thereto for causing pulses developed across said primary winding to have a predetermined waveform; and switching means for altering a number of turns between adjacent capacitive elements at the end of any combination remote from said one end of the coil to establish the requisite number of turns as aforementioned for establishing said predetermined pulse waveform, said switching means being mechanically coupled to said switch means so as to automatically provide the desired winding correction for any combination of capacitive networks connected to said primary winding.

9. The combination defined in claim 8, wherein said switching means and said switch means are ganged to open and close together.

References Cited in the file of this patent
UNITED STATES PATENTS
2,416,114 Nelson _____ Feb. 18, 1947